United States Patent [19]
Myers

[11] Patent Number: 5,921,780
[45] Date of Patent: Jul. 13, 1999

[54] RACECAR SIMULATOR AND DRIVER TRAINING SYSTEM AND METHOD

[76] Inventor: Nicole J. Myers, 152 S. Iredell Industrial Park Rd., Mooresville, N.C. 28115

[21] Appl. No.: 08/672,459

[22] Filed: Jun. 28, 1996

[51] Int. Cl.$^6$ .................................................. G09B 9/05
[52] U.S. Cl. ............................... 434/69; 434/29; 434/62; 434/307 R; 463/6; 364/578; 395/500
[58] Field of Search .................................. 434/29, 30, 45, 434/60–69, 71, 307 R, 308, 365; 463/6, 7, 35–40; 348/39, 114–124; 472/60, 136, 130, 59, 61; 395/500; 364/578; 345/121, 145, 156, 326, 161, 163; 244/3.14, 190; 273/148 B, 442, 440

[56] References Cited

U.S. PATENT DOCUMENTS

| | | |
|---|---|---|
| 4,182,053 | 1/1980 | Allen et al. . |
| 4,464,117 | 8/1984 | Foerst ......................................... 434/67 |
| 4,750,888 | 6/1988 | Allard et al. ................................ 434/69 |
| 4,752,065 | 6/1988 | Trumbull et al. ........................... 472/60 |
| 4,817,948 | 4/1989 | Simmonelli ............................ 434/71 X |
| 4,855,822 | 8/1989 | Narendra et al. ......................... 348/114 |
| 4,949,119 | 8/1990 | Moncrief et al. ....................... 434/71 X |
| 4,952,152 | 8/1990 | Briggs et al. . |
| 5,184,956 | 2/1993 | Langlais et al. . |
| 5,197,003 | 3/1993 | Moncrief et al. .......................... 434/71 |
| 5,277,584 | 1/1994 | DeGroat et al. ....................... 434/71 X |
| 5,320,538 | 6/1994 | Baum . |
| 5,353,242 | 10/1994 | Crosbie et al. .......................... 364/578 |
| 5,366,376 | 11/1994 | Copperman et al. . |
| 5,388,991 | 2/1995 | Morris . |
| 5,453,011 | 9/1995 | Feuer et al. . |
| 5,474,453 | 12/1995 | Copperman . |
| 5,547,382 | 8/1996 | Yamasaki et al. ..................... 434/69 X |
| 5,707,237 | 1/1998 | Takemoto et al. ......................... 434/69 |
| 5,734,373 | 3/1998 | Rosenberg et al. ..................... 345/161 |

FOREIGN PATENT DOCUMENTS

| | | | |
|---|---|---|---|
| 290-364 | 11/1988 | European Pat. Off. ................. | 434/66 |
| 890-428 | 12/1981 | Russian Federation ................. | 434/66 |

*Primary Examiner*—Joe H. Cheng
*Attorney, Agent, or Firm*—LaMorte & Associates

[57] ABSTRACT

A simulator system for providing a realistic simulation of a racecar. The simulator systems provides a driver with substantially the same visual and auditory stimuli as would a real racecar. The physical forces experienced by the driver include steering wheel movement, chassis movement and large changes in vertical, horizontal and lateral G forces as the racecar corners around turns on sloped racetrack embankments. Since the simulator accurately simulated the forces experienced when driving a real racecar, the present invention simulator can be used to physically train drivers as well as mentally train drivers. Prior to a simulation, a driver selects a type of racecar. Every adjustable feature of the racecar selected that is capable of effecting the driving performance of the racecar is given a default value that the driver may change. As a result, the performance of the simulated racecar can be selectively adjusted to match that of a real racecar for which the driver is accustomed. Similarly, changes can be made to a racecar and the driver can become accustomed to those changes without the expense or danger of experimenting with those changes in a real racecar.

19 Claims, 7 Drawing Sheets

5,921,780

RACECAR SIMULATOR AND DRIVER TRAINING SYSTEM AND METHOD

BACKGROUND OF THE INVENTION

1. Field of the Invention

The present invention relates to vehicle simulators that accurately mimic the visual, audible and physical sensations of driving a real vehicle. More specifically, the present invention relates to racecar simulators wherein a racecar driver can simulate different racecar types, performance characteristics, racetracks and weather conditions for training purposes.

2. Description of the Prior Art

The prior art is replete with different types of vehicle simulators that are used for both entertainment and training purposes. For example, there are many commercially available video games and computer games that simulate racecar driving. These games provide changing video images and audio sounds that are dependent upon the manipulations of controls by the person playing the game. Such prior art simulator games are exemplified by U.S. Pat. No. 5,366,376 to Copperman et al., entitled DRIVER TRAINING SYSTEMS AND METHOD WITH PERFORMANCE DATA FEEDBACK and U.S. Pat. No. 4,952,152 to Briggs et al., entitled REAL TIME VEHICLE SIMULATION SYSTEM. The problem with such video simulators is that they are designed for entertainment and the simulation provided is far removed from reality in terms of vehicle performance. Furthermore, the person using the simulator typically remains stationary and does not experience realistic physical movements that would be present in a real moving vehicle.

Training simulators, such as those used by commercial pilots, are far more sophisticated than are simulator games. Training simulators tend to have realistic controls and often the simulator itself includes a dynamic motion system that provides some degree of physical motion to the person in the simulator. Such prior art simulator systems are exemplified by U.S. Pat. No. 5,453,011 to Feuer et al., entitled FLIGHT SIMULATOR and U.S. Pat. No. 5,388,991 to Morris, entitled SIMULATION DEVICE AND SYSTEM. Such training simulators typically only have a limited range of motion. As such, although the person in the simulator experiences some degree of motion, the motion experienced is far less than what a person would truly experience in a real vehicle.

Training simulators typically are capable of varying simulated weather conditions. However, the performance of the simulated vehicle remains constant or varies only slightly with the changing weather conditions. For the purposes of the simulation, the performance characteristics are for a particular model airplane are considered to be constant. A pilot who flies a certain model airplane, therefore can enter a simulator for that type of airplane and the pilot would experience the same performance characteristics that are engineered into the real airplane. The pilot would therefore recognize little or no difference between the performance of the simulated airplane and the performance of the real airplane.

In many classes of professional racecar racing, the racecars are so sophisticated that the performance characteristics of the racecar are capable of being changed to customize the racecar for each race. In fact, the performance characteristics of a racecar are often changed during the race to optimize performance or to adapt to changing racing conditions. Depending upon the type of racecar, there are dozens of variable elements designed into the structure of the racecar that must be adjusted each time the racecar is run. As a result, no two racecars share the exact same performance characteristics. Each racecar is unique unto itself and the driver of the racecar adapts his/her driving style to the performance characteristics embodied by the racecar. Since no two racecars share the exact same performance characteristics, a simulator that embodies only one standard racecar with set performance characteristics is of little or no use in training a professional racecar driver. Rather, a need exists for a racecar simulator that can be selectively programmed and configured to mimic the exact performance characteristics of a specific racecar. This way a racecar driver can recreate his/her racecar and can train without having to actually run the real racecar.

In addition to experience training, professional racecar drivers also must train for the physical requirements of driving a racecar. In high-speed racing, such as Indy car racing and NASCAR racing, the races can last for hours. During the race, the racecar driver experiences a wide range of physical forces as the racecar accelerates, brakes, passes and corners. Depending upon the shape of the racetrack, a racecar driver experiences varying forces of between 1G and 4Gs during the entire duration of the race. In order to compensate for the increased G forces and the physical exertion set forth by the racecar driver, a racecar driver's pulse nearly doubles and remains at this elevated level throughout the race. In order for a racecar driver to optimally perform during such prolonged periods of physical stress, a great deal of physical conditioning is required.

Many training simulators that contain dynamic motion systems are designed primarily to train the reflexes and decision making skills of the person in the simulator. A typical training simulator with a dynamic motion system may be able to create a force of a few Gs for a second or two. However, such motion is not nearly adequate enough to physically train a racecar driver that is exposed to varying G forces throughout the entire duration of a race.

In the past, the way racecar drivers normally trained was to actually run the racecar. By running the racecar, the driver receives both experience training and physical training and the race crew has a chance to experiment with the performance characteristics of the racecar. However, there are many obvious disadvantages of training by actually running a racecar. Primary among these disadvantages is cost. Racecars are very expensive, as is their fuel, their tires and their drive train parts. Furthermore, high performance racecars can only be run on racetracks during the day, during good weather conditions and with the support of a pit crew and emergency medical personnel. As such, the running of a racecar is an expensive endeavor that takes the coordinated efforts of several people. Furthermore, every time a racecar driver drives a racecar, the racecar driver is endangering his/her own life. As a result, the pit crew that maintains the racecar is unlikely to make large changes in the performance of a racecar or otherwise experiment with the racecar in a manner that may cause the racecar to feel unfamiliar to the racecar driver and possibly cause a crash.

A large need therefore exists in the art for a racecar simulator that can be customized to the specific performance characteristics of a particular racecar at a particular track and during a particular set of weather conditions.

A need also exists for a racecar simulator capable of both physically and mentally training a racecar driver by subjecting the person in the simulator to the same physical stresses experienced in a real racecar during a race.

Lastly, a need exists for a racecar simulator where changes can be made to the performance characteristics of a racecar and those changes can be evaluated without endangering the life of the racecar driver or incurring the expense of actually running a racecar.

These needs are met by the present invention racecar simulator as described and claimed below.

SUMMARY OF THE INVENTION

The present invention is a simulator system for providing a realistic simulation of a racecar. The simulator system provides a driver with substantially the same visual and auditory stimuli as would a real racecar. Additionally, the present invention simulation system also subjects a driver to substantially the same physical forces that would be experienced in a real race. The physical forces experienced by the driver include steering wheel movement, chassis movement and large changes in vertical, horizontal and lateral G forces as the racecar corners around turns on sloped racetrack embankments. Since the simulator accurately simulates the forces experienced when driving a real racecar, the present invention simulator can be used to physically train drivers as well as mentally train drivers.

Prior to a simulation, a driver selects a type of racecar. Every adjustable feature of the racecar selected that is capable of effecting the driving performance of the racecar is given a default value that the driver may change. As a result, the performance of the simulated racecar can be selectively adjusted to match that of a real racecar to which the driver is accustomed. Similarly, changes can be made to the simulated racecar and the driver can become accustomed to those changes without the expense or danger of experimenting with those changes in a real racecar.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Although the present invention simulator system can be used to simulate almost any type of racecar, such as an Indy car, formula one racecar, NASCAR racecar, spring car, funny car or the like, by way of example, the present invention simulator system will be described in an embodiment that simulates a NASCAR racecar. Such a configuration is presented merely for exemplary purposes and is not intended in any manner to limit the application of the present invention simulator system to just one type of racecar.

The present invention is a simulator system that realistically simulates a racecar. The simulator system accurately simulates the physical, visual and auditory sensations experienced by a driver when actually driving a racecar. The purpose of the simulator system is not that of amusement. Rather, the purpose of the simulator system is to train professional racecar drivers and help those drivers develop both the physical and mental skills required to drive a modern racecar. The simulator system also enables design engineers to experiment with changes in racecar design without having to be concerned with the safety of the driver testing the experimental changes.

Figure 1:
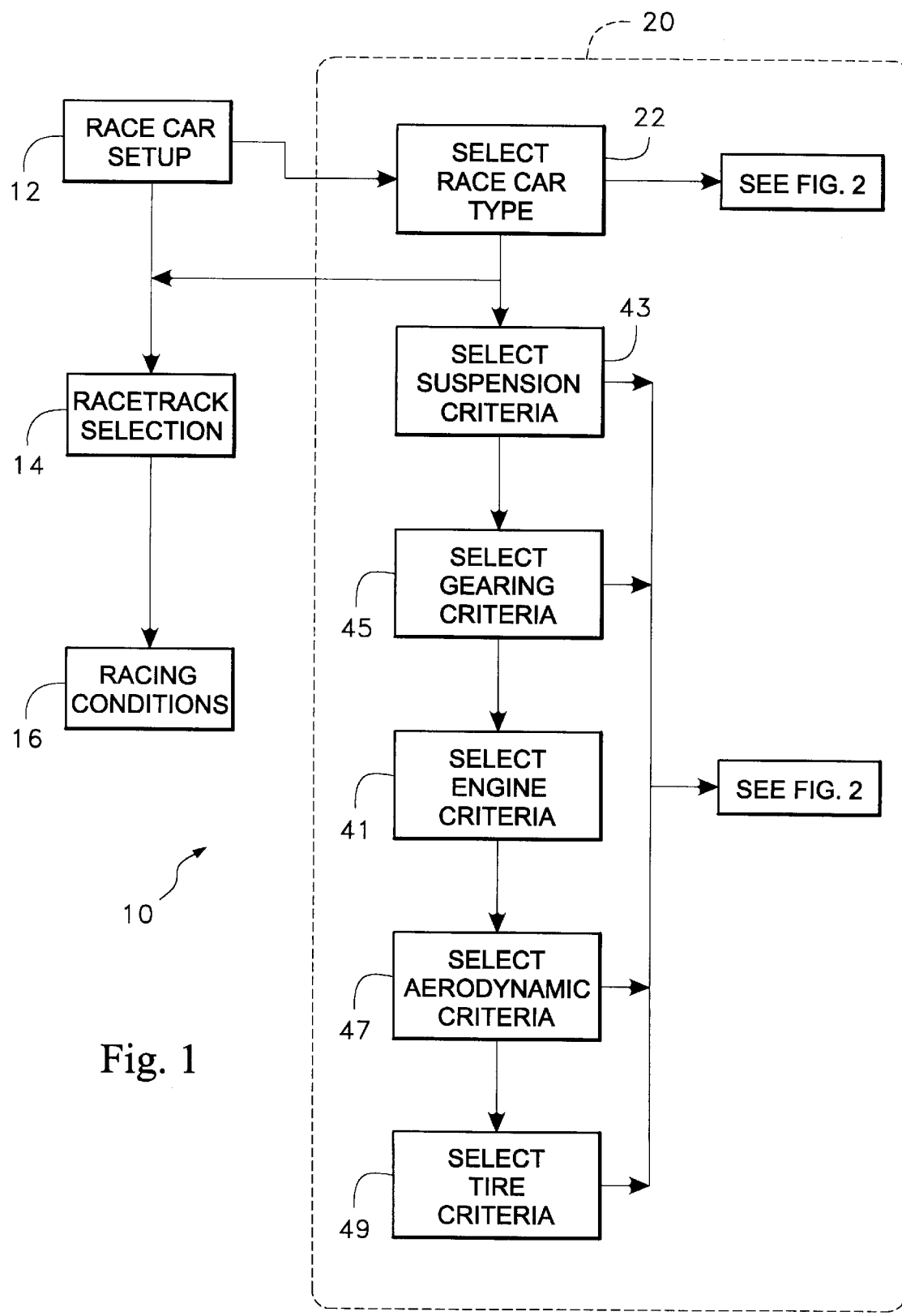
FIG. 1 is a block diagram schematic outlining the overall logic of initially setting up a racecar simulation in accordance with the present invention.

Referring to FIG. 1, a general schematic of a simulator system 10 made in accordance with the present invention is shown. The general schematic sets forth the simulator/driver interactions that are required to be made prior to a driver proceeding with a simulation. As is indicated by block 12, block 14 and block 16, respectively, prior to any simulation, a driver must select the setup of racecar to be driven, the racetrack to be driven upon and the racing conditions. However, in order to realistically simulate a real racecar driving on a real racetrack under realistic racing conditions, there are a multitude of other variables that must be quantified and entered into the simulator system 10.

Beginning with the setup of the racecar, as indicated by block 12, an initial subroutine 20 is shown in FIG. 1 that is used to quantify some of the variables needed to produce an accurate simulation. Professional racing teams typically know a great deal of information about the performance characteristics of their racecars. For example, racing teams typically know the power of the racecar, the aerodynamic characteristics of the racecar and they know how every adjustable component of the racecar effects the overall performance of the racecar. Much of this information is known to the racing team through experience and trial and error experimentation. However, some of the performance characteristics are known through mathematic modeling and/or laboratory testing, such as wind tunnel testing. Many racing teams also employ some form of racecar data acquisition (RDA) systems wherein various types of sensors are placed within the racecar and data recorded by those sensors are analyzed by computer to quantify the performance of the racecar and the performance of the driver. Such RDA systems are identified and explained in *DATA POWER USING RACECAR DATA ACQUISITION* by Buddy Fey, Towery Publishing, Inc. 1993. Using such RDA systems, the vertical, horizontal and lateral G forces experienced by the racecar can be measured, as well as other performance criteria such as shifting efficiency and the engine RPM-to-speed ratios throughout the various gears.

Figure 2:
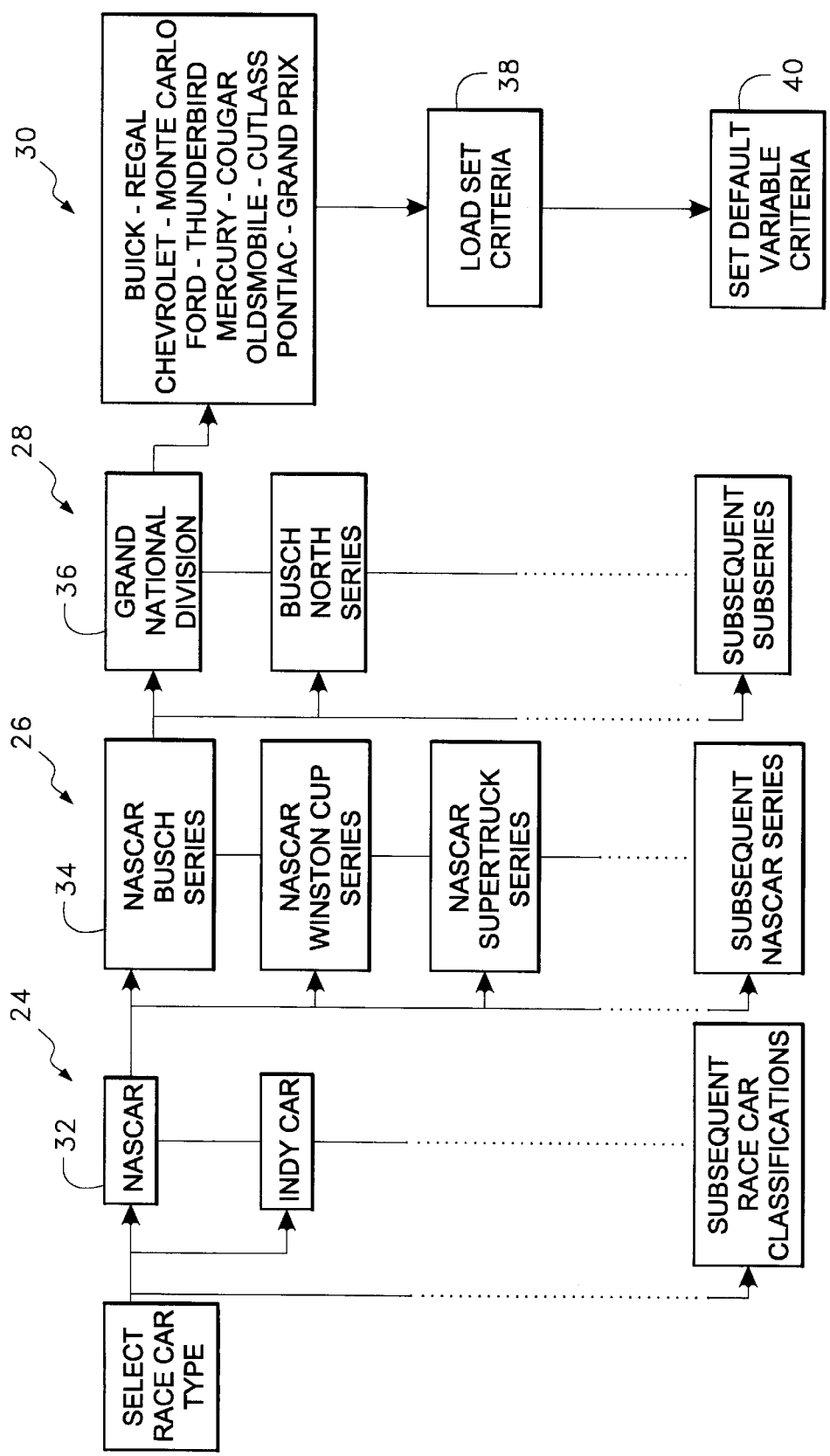
FIG. 2 is a block diagram schematic illustrating the preferred steps used in selecting a racecar to be simulated in accordance with the present invention.

In FIG. 1, it can be seen from block 22 that the first step in the setup of the racecar is the selection of the racecar type. In professional racecar racing, there are many different classifications of racecars. Many of these racecars have subclasses that define specific parameters for the racecars in a particular race. Referring to FIG. 2, it can be seen that a driver is first given the selection of major racecar classifications 24, such as NASCAR, Indy car and the like. After a major racecar classification 24 is selected, the driver is presented with the major racing series 26 available for the selected classification 24. After a selection, the driver is then presented with the racing subseries 28 available for the major racing series 26 selected. Finally, after a racing subseries 28 is selected, the driver is presented with model body types 30 available in that racing subseries 28. By way of example, in FIG. 3, a driver selected NASCAR 32 as the major racecar classification 24. The driver then selected NASCAR BUSCH SERIES 34 as the major racing series 26 and the Grand National Division 36 as the racing subseries 28. According to the 1996 rules governing the NASCAR BUSCH series, Grand National Division, six 1996 car model body types are acceptable. The model body types 30 include the Buick Regal, Chevrolet Monte Carlo, Ford Thunderbird, Mercury Cougar, Oldsmobile Cutlass and Pontiac Grand Prix. Once the driver selects a particular model body type 30, the criteria for that model body type 30 that is not variable is read by the simulator system, as indicated by block 38. As is indicated by block 40, criteria for the model body type 30 selected that is variable is initially set to a default setting that can be selectively altered by the driver, as will later be explained.

Returning to FIG. 1, it can be seen that the racecar criteria that is variable includes engine criteria (see block 41), suspension criteria (see block 43), gearing criteria (see block 45), aerodynamic criteria (see block 47) and tire criteria (see block 49). The specific features on the racecar that can be adjusted to effect the different viable criteria depends upon the racecar selected and the official NASCAR rules.

Values for the different variables of a racecar can be typed into the simulator by a driver or can be selected from a menu of possible options. However, the preferred manner uses a master icon plate upon which are displayed the variable criteria for the racecar selected. A driver then would interface with the simulator system via the master icon plate in order to inform the simulator system of the specific racecar characteristics to be simulated.

Figure 3:
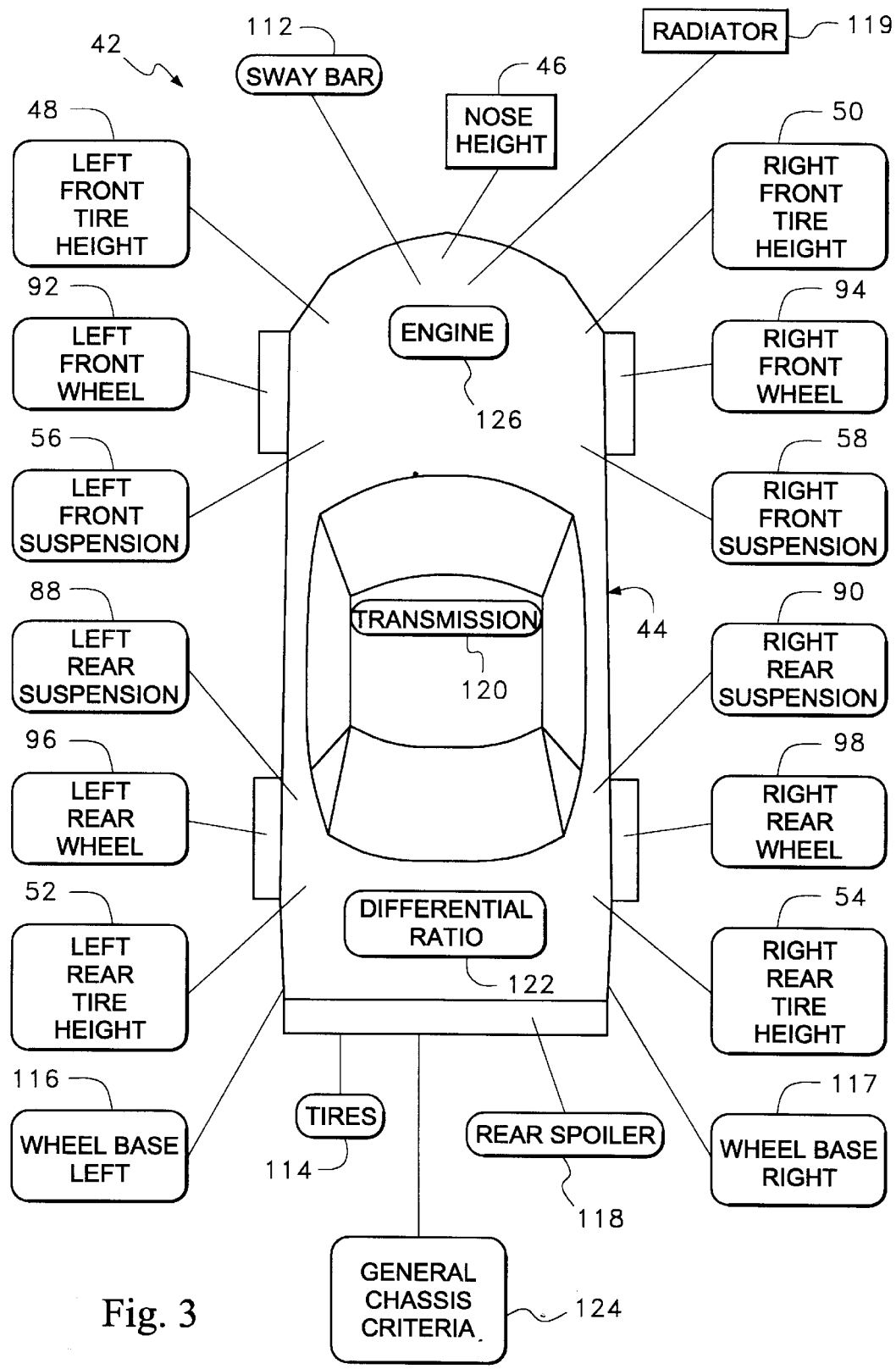
FIG. 3 is an illustration of a master icon plate used to select and enter variables concerning the physical attributes of the racecar to be simulated.

Referring to FIG. 3, an exemplary master icon plate 42 is shown. The master icon plate 42 shows the outline 44 of the top view of a racecar. The shape of the outline 44 depends upon the type of racecar initially selected by the driver. In FIG. 3, a NASCAR racecar outline is shown since the description previously described the driver as selecting a NASCAR racecar. On the master icon plate 42 are disposed a plurality of icon blocks that can be accessed by the driver. The icon blocks can be selected either by a touch screen or a mouse/keyboard controlled positionable selection prompt.

Figure 4:
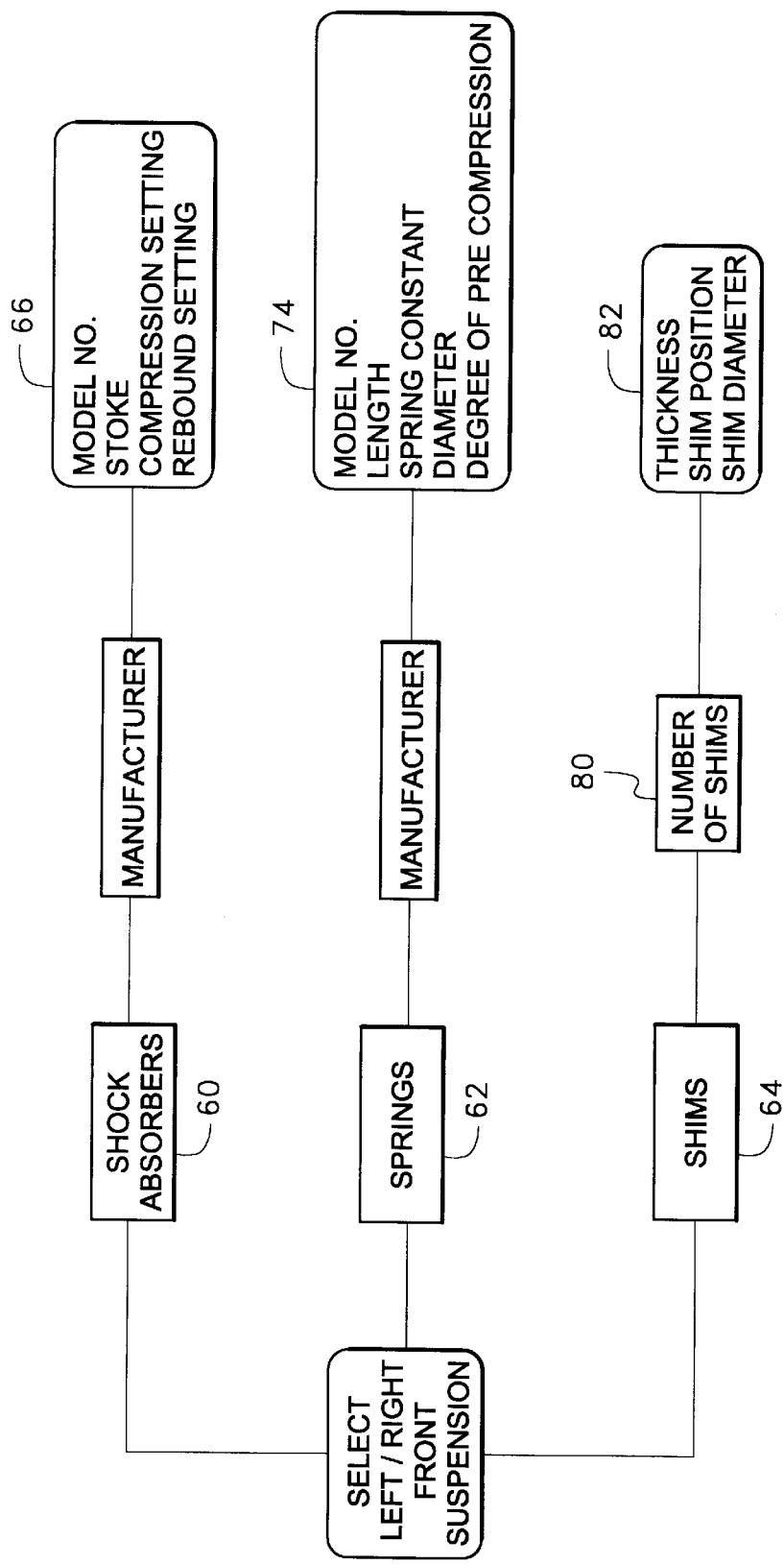
FIG. 4 is a block diagram schematic illustrating the steps used in selecting specific physical attributes for racecar suspension from a general selection made from the master icon plate of FIG. 3.

On the master icon plate 42, there are a plurality of chassis height related icon blocks. These blocks include the nose height icon block 46, the left and right front height icon blocks 48, 50 and the left and right rear height icon blocks 52, 54. By selecting one of these height related icon blocks, a driver can enter the heights that he/she prefers for his/her racecar at these various points on the chassis. The chassis heights selected for the different sections of the racecar effect how the weight of the racecar is distributed on the tires and, to a lesser degree, effects the aerodynamics of the racecar. Suspension characteristics are also dependent upon the front and rear suspension of the racecar. At the top of the racecar outline 44 on the master icon plate 42 are disposed two front suspension icons 56, 58. When a driver selects either the left front suspension icon 56 or the right front suspension icon 58, the driver is then presented with the variable features associated with those assemblies. Referring to FIG. 4, it can be seen that when a driver selects one of the front suspension icons 56, 58 (FIG. 3), then the driver is presented with the choice of adjusting the shock absorbers, shims and springs present within the front suspension, as represented by block 60, 62 and 64, respectively. If the driver selects the shock absorber icon (block 60), then the driver is prompted with the various manufacturers of NASCAR shock absorbers. The driver selects the appropriate manufacturer, whereby the driver is prompted to either select or enter the model number of the shock absorber. (See block 66). Once the model number is selected, default values for the stroke, compression setting and rebound setting are read from memory. If a driver wants to custom adjust the settings for the stroke, compression setting and rebound setting, then the driver can do so by selecting the appropriate icon prompt.

If the driver selects the spring icon (block 64), then the driver is prompted with the various manufacturers of NASCAR suspension springs. The driver selects the appropriate manufacturer, whereby the driver is prompted to either select or enter the model number of the suspension spring. Once the model number is selected, default values for the spring constant, length and diameter of the spring are read from memory. If the driver uses a customized suspension spring, then the driver can vary the values for the spring constant, length and diameter of the spring by selecting the appropriate icon prompt, as indicated in block 74.

If the driver selects the shim icon (block 62), then the driver is prompted with an icon (block 80) that asks for the number of shims and a subsequent icon (block 82) that inquires about the location, thickness and diameter of the shims.

Returning to FIG. 3, it can be seen that at the bottom of the racecar outline 44 there are two rear suspension icons 88, 90. When a driver selects either the left rear suspension icon 88 or the right rear suspension icon 90, then the driver is presented with the variable features associated with those assemblies. The variable features are presented in a manner similar to that of the front suspension which has been described in conjunction with FIG. 4 and need not be set forth in detail herein.

Figure 5:
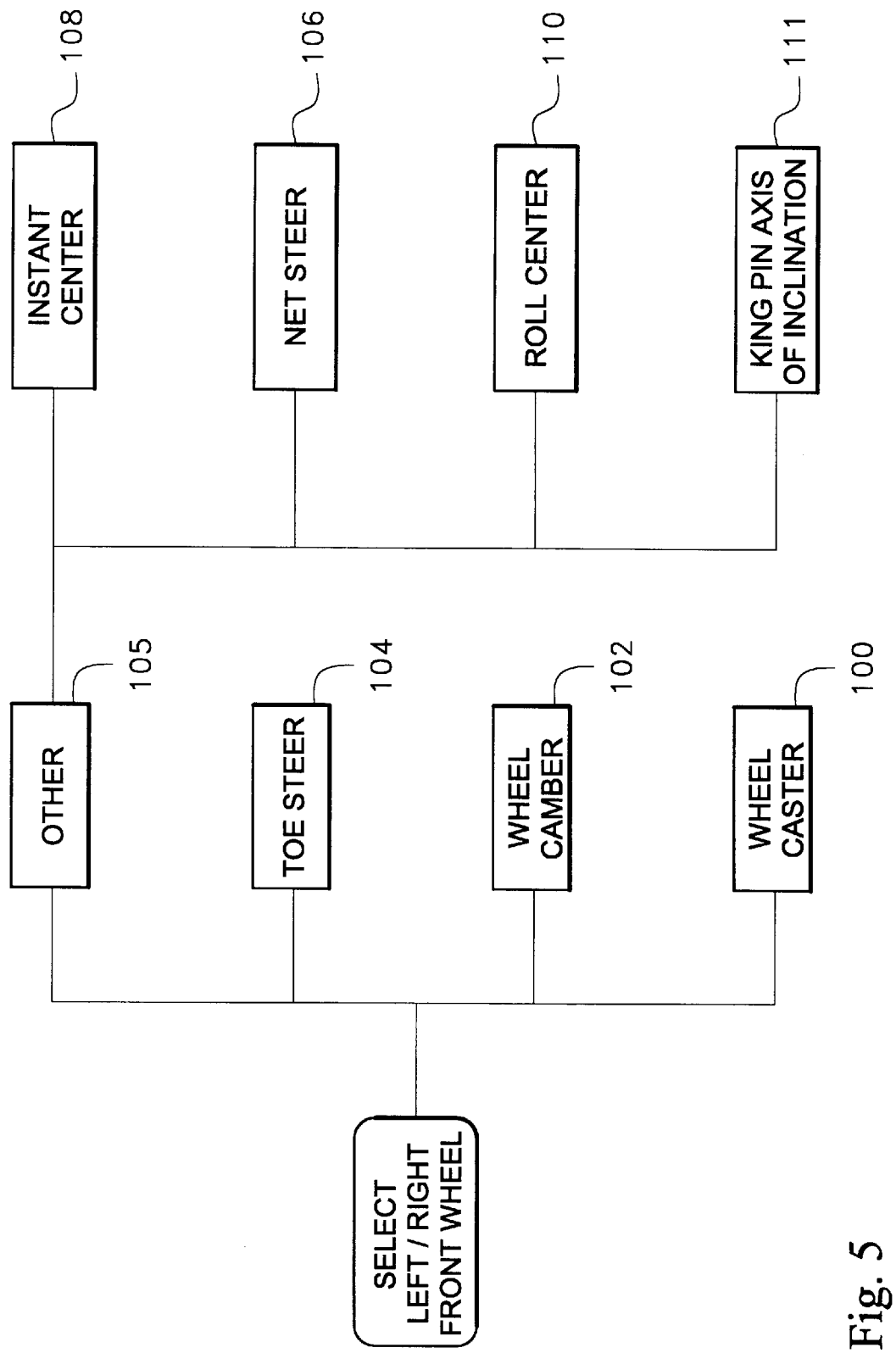
FIG. 5 is a block diagram schematic illustrating the steps used in selecting specific physical attributes for racecar wheel criteria from a general selection made from the master icon plate of FIG. 3.

The racecar outline 44 on the master icon plate 42 also includes four wheel icons 92, 94, 96, 98. When a driver selects one of the four wheel icons, then the driver is presented with the variable features associated with those assemblies. Referring to FIG. 5, it can be seen that when a driver selects one of the front wheel icons 92, 94 (FIG. 3), then the driver is presented with variables that include wheel caster (block 100), wheel camber (block 102) and wheel toe steer (block 104). If such variables are insufficient to characterize the wheel's configuration, then the driver can access the prompt indicated as "other" (block 105), wherein the driver can enter values for net steer (block 106), instant center (block 108), roll center (block 110) and kingpin axis inclination (block 111).

Returning to FIG. 3, when a driver selects one of the two rear wheel icons 96, 98, the driver is presented with the variable features associated with those assemblies. The variable features are presented in a manner similar to that of the front wheel icons which have been described in conjunction with FIG. 5.

The racecar outline 44 on the master icon plate 42 includes a sway bar icon 112. When selected, the sway bar icon 112 will prompt the driver either to enter the manufacturer and model of the sway bar and/or enter a value indicative of sway bar twist, length and position of attachment.

A general tire icon 114 also is presented on the master icon plate 42. When the tire icon 114 is selected, the driver is prompted to enter a tire manufacturer and model number.

The driver is also prompted to enter a desired tire pressure for each of the four tires.

A wheelbase icon 116, 117 is presented on the master icon plate 42 for each side of the racecar. When selected, each wheelbase icon prompts a driver to enter the values for the racecar's wheelbase for both the left and right sides of the vehicle.

A NASCAR BUSCH SERIES racecar has a rear spoiler. As such, the racecar outline 44 on the master icon plate 42 includes a rear spoiler icon 118. When the rear spoiler icon 118 is selected, the driver is prompted to select the angle of the spoiler and the height of the spoiler. The size of the spoiler is selected at default to be in accordance with NASCAR racing rules.

The gearing of the racecar is divided into two separate icons on the master icon plate 42. A transmission icon 120 is presented so that the transmission can be selected by the driver. Depending upon the type of racecar selected by the driver, when the transmission icon 120 is selected, the driver is prompted with the transmission types permitted under the rules. If no rules apply, the driver is prompted with the number of gears desired and the desired gear ratio for each gear.

The gearing of the racecar's rear differential can be adjusted by accessing the rear differential icon 122 on the master icon plate 42. Once selected, the rear differential icon 122 enables a driver to adjust the gearing ratio for the rear differential in the simulator system.

The engine of racecars have many variables. To alter these variables, an engine icon 126 is presented on the master icon plate 42. The purpose of engine variables is to adjust available horsepower and/or fuel efficiency of the engine. As such, instead of providing a separate icon for every adjustable element in the engine, the driver is prompted to enter values for the engine in terms of horsepower, torque and fuel efficiency at at least one RPM speed.

A radiator icon 119 is also presented on the master icon plate 42. When the radiator icon 119 selected, the driver is prompted to enter the size of the radiator and the degree to which the radiator is restricted. Many times, racecar teams tape a radiator to reduce its effective size. This results in higher engine temperatures and alters the performance and the aerodynamics of the racecar.

The last icon presented on the master icon plate 42 is a general chassis icon 124. By selecting the general chassis icon 124, the driver can vary some of the general parameters about the racecar that are not addressed by any of the other icon options on the master icon plate 42. The general parameters that can be adjusted include the weight of the racecar, the weight of the driver, added weight distribution, gas capacity, overall Reynold's number for the car and/or overall coefficient of drag.

Every variable that can be changed using the master icon plate 42 is preferably initially set at a default value. The default values can be factory settings. However, the various default values are preferably an average of the values entered into the simulator for similar types of racecars.

Once a driver selects all the variables in the simulator that are necessary to accurately simulate the driver's real racecar, that setup criteria can be saved in memory and selectively recalled. This enables a racecar driver to fully program the simulator system only once. Small changes in the setup of the simulator can then also be tried and saved or erased, thereby enabling rapid setup for the purposes of experimentation.

Returning to FIG. 1, it can be seen that after the initial setup of the racecar is complete, the driver selects the racetrack to drive upon. (See block 14). The racetracks that can be selected depend upon the racecar classifications selected and series of races selected. In the exemplary embodiment, a NASCAR racing car was selected for the BUSCH series, Grand National Division. As such, the driver is presented with a choice of racetracks that are used within this division. Some of these racetracks include the Atlanta Motor Speedway, Bristol International Raceway, Charlotte Motor Speedway, Darlington Raceway, Daytona International Speedway and the like. The physical characteristics of each of these speedways is known and is stored within the simulator system.

Lastly, as is shown in FIG. 1, after the racecar has been setup and the racetrack has been selected, race conditions must be selected, as is indicated by block 16. The racing conditions to be selected include ambient variables such as temperature, time of day, degree of cloud cover, degree of precipitation and the like. Other race condition variables include the number of other racecars on the racetrack, pole position, pit crew location and the like.

Figure 6:
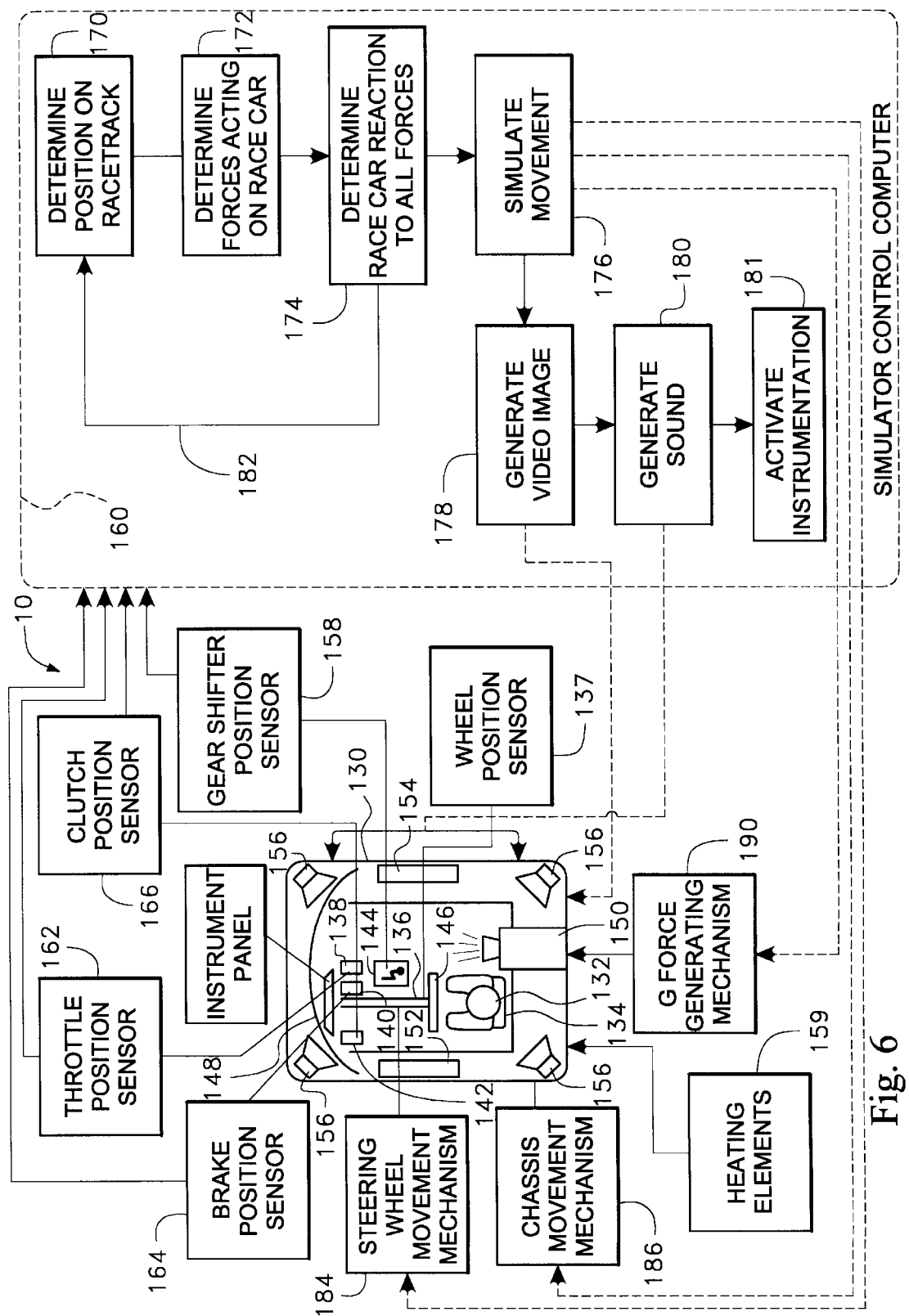
FIG. 6 is a block diagram schematic of the overall simulator system control illustrating the preferred steps used by a controller to recursively regulate the sights sounds and movements within the simulator.

After the racing conditions have been selected, the simulator system now has all the variables required to simulate a race for a particular driver in a particular racecar. Referring to FIG. 6, a general schematic overview of the simulator system 10 is shown. In the preferred embodiment, the simulator system 10 includes a simulated cockpit chamber 130 in which a driver 132 sits. Within the simulated cockpit chamber 130, the driver 132 is presented with a realistic duplication of a real racecar cockpit. The simulated cockpit chamber 130 includes a seat 134, steering column 136, gas pedal 138, brake pedal 140, clutch pedal 142 and gear shifter 144 that all can be adjusted in position with respect to one another. As a result, the driver 132 can adjust the simulated cockpit chamber 130 to mimic the physical layout of the driver's real racecar. The steering wheel 146 within the simulated cockpit chamber 130 is interchangeable with others of different sizes, thereby enabling the driver to match the steering wheel used within the driver's real racecar.

Within the simulated cockpit chamber 130, a projection screen 148 is positioned in front of the driver. The projection screen 148 preferably has the same shape and is in the same position as would be the windshield in a real racecar. A video image projector 150 is positioned out of the range of sight of the driver 132. The video image projector 150 projects a video image onto the projection screen 148 in front of the driver 132. The video image can be a computer generated image or can be real recorded images stored and retrieved by computer. The image projected onto the projection screen 148 simulates the images that would be visible through the windshield of a racecar during a real race.

When a driver is driving in a real race, the driver does not just look out of the racecar's windshield. Rather, many times during a race, the driver looks through the side windows of the racecar to see what is adjacent to his/her racecar. Two video displays 152, 154 are disposed on either side of the simulated cockpit chamber 130. The video displays 152, 154 are preferably the same shape and size as would be the side windows in a real racecar. The video displays 152, 154 display images that simulate what would be visible through the side windows of a real racecar.

Audio speakers 156 are disposed within the simulated cockpit chamber 130. The audio speakers 156 are preferably disposed at points surrounding the head of the driver 132, so the driver 132 has the realistic impression of being surrounded by sound.

The audio speakers 156, the front projection screen 148 and the two side video displays 152, 154 enable the sights and sounds of a real race to be simulated within the cockpit chamber 130. Unlike video game simulators designed for entertainment, the present invention simulator system is designed to simulate a real racecar on a real racetrack as realistically as possible. Once the simulator system 10 is setup and the driver enters the simulated cockpit chamber 130, the driver 132 has continuous control over five variables, namely the steering wheel position, the gear shifter, the clutch position, the brake position and the throttle position. The steering column 136 is coupled to a positional sensor 137 that reads the position of the steering wheel 146 to a simulator control computer 160. Similarly, the gear shifter 144, gas pedal 138, brake pedal 140 and clutch pedal 142 are also coupled to positional sensors 158, 162, 164, 166, respectively, that relay the position of these elements to a simulator control computer 160.

Heating elements 159 are contained within the cockpit chamber 130. The heating elements 159 raise the temperature in the cockpit chamber depending upon the weather conditions and duration of the race being simulated. As such, the driver will experience the same extremes in temperature as would be experienced in a real racecar.

In an alternate embodiment, the images and sounds that are seen and heard by the driver can be produced within the confines of a virtual reality display system contained within a helmet. Such a virtual reality system would eliminate the need for separate front and side displays. However, physical controls would still be present within the cockpit chamber.

The simulator control computer 160 controls the auditory, visual and physical aspects of the simulation dependent upon the setup variables initially programmed into the simulator system 10 as well as the driver controlled variables that constantly change during the simulation. As is indicated by block 170 in FIG. 6, the simulator control computer 160 initially determines the position of the simulated racecar on the selected racetrack. The simulation begins with the racecar at the starting line or in the starting queue if other racecars are part of the simulation. The simulator control computer 160 reads the characteristics of a particular racetrack from memory once the racetrack is selected. The simulator control computer 160 then updates the position of the racecar on the racetrack depending upon the projected forces acting on the racecar during a given interval of time. As is indicated by block 172, the forces that act upon the racecar are determined by the simulator control computer 160 and depend upon the speed of the racecar, the position of the racecar on the racetrack and the orientation of the racecar at a given moment in time. The forces that act upon a racecar at any given moment in time include G forces caused by the movement of the racecar, aerodynamic drag forces and thrust forces caused by the engine's movement of the rear tires. The G forces experienced by the racecar depend upon the speed of the racecar, the orientation of the racecar, the curve and slope of the racetrack and whether or not the racecar is accelerating or decelerating. Since all these variables are known for the racecar at a given moment in time, the G forces acting on the racecar along the x-axis, y-axis and z-axis can be calculated. The aerodynamic drag forces are a function of the racecar's aerodynamic efficiency, speed, ambient wind speed and ambient wind direction. The aerodynamic drag forces are also dependent upon the presence of other racecars in the simulation from which drafting may result. The change in drag due to drafting is calculated by the simulator control computer 160 as a function of the position of the subject racecar with respect to other racecars present in the simulation.

The forces created by the engine's effect on the rear wheels of the racecar are calculated as a function of the engine's RPMs, the horsepower and torque of the engine at those RPMs, the type of tires, tire pressure, projected tire wear, roll resistance, transmission gearing, rear differential gearing and clutch position. Since tires and clutches wear out during the course of a real race, the value associated with one clutch position is changed by the simulator control computer 160 as a function of time, as is projected tire wear.

Once the forces acting on the simulated racecar are calculated, as indicated by block 174, the reaction of the racecar to those forces at that instant in time is calculated. To calculate the reaction of the racecar, the orientation of the racecar at that moment in time is analyzed. In that orientation, all the applicable forces are calculated. The suspension criteria is then analyzed to determine the forces that act on each of the four wheels of the racecar. Once the forces acting on each wheel are known, the movement of each wheel in response to those forces can be calculated for that instant in time.

The sum of the G forces, aerodynamic forces and wheel forces in the x-axis, y-axis and z-axis are read to the various mechanisms that move the simulated cockpit chamber 130. Furthermore, the calculated movement of each of the four wheels for that instant in time are also read to the various mechanisms that move the simulated cockpit chamber 130. As is indicated by block 176 in FIG. 6, by simulating the forces that act on the driver 132 and simulating the movements of the racecar for a given instant, an accurate physical simulation is presented to the driver 132, wherein the specific characteristics of the racecar entered during the initial setup realistically effects the performance of the racecar during simulated driving.

As is indicated by block 178, once the movement of the racecar in a given moment in time is calculated, the visual image needed to display that movement can be either generated or recalled from memory. Similarly, as indicated by block 180 and block 181 respectively, the auditory sounds and instrumentation displays appropriate for such movement can also be generated.

The simulator control computer 160 operates in a recursive fashion as indicated by return loop line 182. To provide the driver in the simulated cockpit chamber 130 with a real time display, the visual imagery should be updated at least ten times a second and preferably at least thirty times a second. At such a recursive speed, the image projected and viewed by the driver 132 will appear continuous and the driver's reactions to the racecar's controls will cause effects in the projected image in real time.

The physical movement of the cockpit chamber 130 is controlled primarily by three separate systems, all of which being directed by the simulator control computer 160. The first of the three systems is the steering column movement system 184. The steering column movement system 184 is coupled to the steering column 136 and provides both a variable torque force to the steering wheel 146 and a vibration force to the steering wheel. The variable torque force and vibrational forces applied to the steering wheel are dependent upon the speed of the simulated racecar and its course along the simulator raceway. The variable torque force and vibrational forces are substantially similar to those experienced by a driver in a real race. As such, the forces applied by the steering column movement system 184 subject the driver 132 to the same arm fatigue during a simulation that the driver would experience in real life.

A chassis movement system 186 moves various parts of the simulated cockpit chamber 130 itself. The purpose of the chassis movement system 186 is to simulate movements that are short in duration and only effect the overall G forces acting upon the driver 132 for less than one second. The chassis movement system 186 simulates the overall vibrational movement experienced by a racecar during a race as well as small bumps caused by a racecar driving over a bump in the raceway. Other small motions capable of being simulated by the chassis movement system include sudden movements caused by changes in racetrack conditions, jarring movements caused by the sudden release of the clutch, change of gears and rapid braking. The chassis movement system 186 also controls the movements of the simulated cockpit chamber 130 when the driver stops for a simulated pit stop.

The overall vertical, horizontal and lateral G forces that act upon a driver driving around an oval racetrack is simulated by a G force generating mechanism 190 that moves the entire simulated cockpit chamber 130 as well as the chassis movement system 186 and the steering column movement system 184. As a result, the movements created by the chassis movement system 186, the steering column movement system 184 and G force generating mechanism 190 can be simultaneously experienced by the driver 132 in the simulated cockpit chamber 130.

Figure 7:
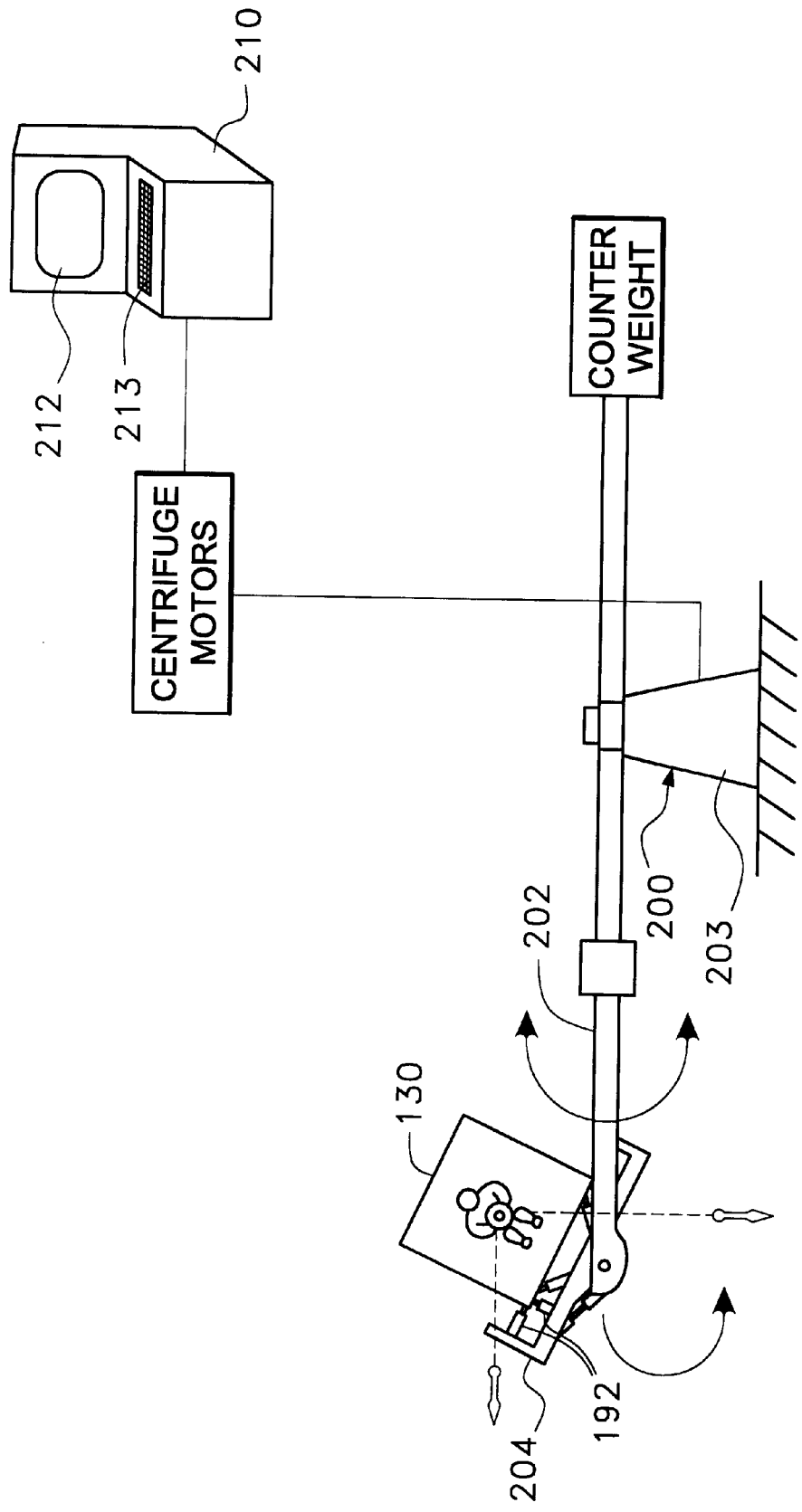
FIG. 7 shows an exemplary physical construction of a simulator in accordance with the present invention.

Referring to FIG. 7, it can be seen that the chassis movement system 186 (FIG. 6) can be constructed by supporting the simulated cockpit chamber 130 on a plurality of pneumatic or hydraulic cylinders 192. By expanding or contracting the various cylinders 192, different parts of the simulated cockpit chamber 130 can be rapidly moved in the x-axis, y-axis or z-axis. Such cylinder-based movement mechanisms are exemplified by U.S. Pat. No. 5,388,991 to Morris, entitled SIMULATION DEVICE AND SYSTEM, which is herein incorporated by reference.

The G force generating mechanism 190 (FIG. 6) is preferably a centrifuge 200, wherein the simulated cockpit chamber 130 itself and the chassis movement system 186 are coupled to the distal end of a centrifuge arm 202. As the centrifuge arm 202 turns around a central support column 203, the simulated cockpit chamber 130 is subject to G forces created by the centrifugal action. The simulated cockpit chamber 130 is mounted on a support frame 204 that joins the simulated cockpit chamber 130 to the centrifuge arm 202. The support frame 204 is pivotably coupled to the centrifuge arm 202. As such, the orientation of the support frame 204 and the simulated cockpit chamber 130 can be selectively altered with respect to the centrifuge arm 202. As can be seen, when a driver 132 is seated in the simulated cockpit chamber 130, the driver 132 is subject to the force of gravity as well as the G forces created by the rotational movement of the centrifuge arm 202. Such a combination of G forces mimics the forces experienced by a driver driving a racecar around the curves of an embanked racetrack. By changing the speed of the centrifuge arm 202, the angular position of the support frame 204 and the orientation of the simulated cockpit chamber 130 with the various cylinders, the resultant G forces acting on the driver 132 in the x-axis, y-axis and z-axis can be selectively controlled. As such, the driver 132 can be extended to prolonged periods of elevated G forces, such as would occur in a real race. Since elevated G forces can be obtained and maintained for the duration of the simulation, a driver can condition his/her body to the G forces, thereby training physically for racing a real car.

In the preferred embodiment, it is desirable for the cockpit to be positionable in an upside down orientation. If the driver crashes during the course of the simulation, the simulator can simulate the racecar flipping as it crashes. By positioning the cockpit chamber in an upside down orientation, a driver can practice escaping from the racecar and/or locating and using a fire extinguisher while disoriented.

In FIG. 7, it can be seen that a control center 210 is coupled to the centrifuge 200. The control center 210 preferably contains the simulation control computer 160 and provides a display 212 so that a person outside of the simulated cockpit chamber 130 can see what the driver 132 in the simulated cockpit chamber 130 sees. The control center 210 also contains a keyboard 213 that enables a person to enter the various variables into the simulator control computer 160. Lastly, the control center 210 enables a person to communicate with a driver in the simulated cockpit chamber 130 or alter the simulation after it has started.

The use of a G force generating mechanism is preferred in order to subject the driver to the prolonged G forces that the driver will experience during a real race. However, if the intention of the driver's use of the simulator systems is to just test a new racecar configuration or practice a certain maneuver, then the use of prolonged G forces would not be necessary. The prior art is replete with simulators that provide only minimal movements. The movements are coupled with moving video images that combine to provide the illusion of real movement. The present invention simulator system can be practiced in such a manner.

It will be understood that the embodiments of the present invention described and illustrated are merely exemplary and many other embodiments can be produced using the teachings of the present invention. It should also be understood that a person skilled in the art can alter the present invention by using alternate components not specifically described. For example, Indy car racecars have different adjustable features than do NASCAR racecars. As such, the present invention simulator system would provide different programming options to a driver, if the driver selected an Indy car racecar instead of a NASCAR racecar. All such modifications and alternate embodiments are intended to be included in the scope of the present invention as defined by the appended claims.

What is claimed is:

1. A simulator for simulating a racecar with performance characteristics that depend upon a plurality of different variables, said simulator comprising:

a cockpit chamber configured to mimic the cockpit of a racecar, wherein said cockpit includes controls for driving said racecar;

at least one display viewable from said cockpit, wherein said at least one display displays images that provide the driver in said cockpit chamber with an Illusion of movement around a racetrack;

at least one mechanism coupled to said cockpit chamber for providing physical movement to said chamber;

an Interface for entering criteria for said racecar including suspension criteria, aerodynamic criteria, engine criteria and gearing criteria; and a controller, coupled to said interface, for controlling said at least one display and said at least one mechanism to correspond in a predetermined manner to the driver's use of said controls, wherein said predetermined manner is dependent upon said criteria entered for said racecar.

2. The simulator according to claim 1, wherein said criteria for said racecar further includes criteria selected from a group consisting of: tire criteria, wheel criteria, chassis height criteria, wheel base criteria and vehicle weight criteria.

3. The simulator according to claim 2, wherein said tire criteria is selected from a group consisting of tire type and tire air pressure.

4. The simulator according to claim 2, wherein said wheel criteria is selected from a group consisting of wheel caster, wheel camber, and wheel toe angle.

5. The simulator according to claim 2, wherein said chassis height criteria is selected from a group consisting of chassis nose height, left front chassis height, right front chassis height, left rear chassis height and right rear chassis height.

6. The simulator according to claim 1, wherein said suspension criteria is selected from a group consisting of sway bar characteristics, front shock characteristics, front spring characteristics, rear shock characteristics, and rear spring characteristics.

7. The simulator according to claim 1, wherein said gearing criteria is selected from a group consisting of transmission gearing ratios and rear differential gearing ratio.

8. The simulator according to claim 1, wherein said engine criteria is selected from a group consisting of horsepower and torque.

9. The simulator according to claim 1, wherein said aerodynamic criteria is selected from a group consisting of wedge angle, wedge height and overall vehicle coefficient of drag.

10. The simulator according to claim 1, wherein said controls include a gear shifter, a brake pedal, a gas pedal, a clutch pedal, a steering column and a steering wheel attached to said steering column.

11. The simulator according to claim 10, wherein said at least one mechanism includes a means coupled to said steering column to provide torque force and vibrational forces to said steering wheel through said steering column.

12. The simulator according to claim 10, wherein said at least one mechanism includes a means for rapidly moving different portions of said cockpit chamber vertically, horizontally and laterally.

13. The simulator according to claim 10, wherein said at least one mechanism includes a means for subjecting said cockpit chamber to a sustained force of up to four G's for the duration of a simulation.

14. A simulator system for providing a simulation to a driver of a racecar racing on a racetrack, comprising:

a cockpit chamber configured to mimic the cockpit of a racecar, wherein said cockpit includes controls for driving the racecar;

at least one display viewable from said cockpit, wherein said at least one display displays images that provide the driver in said cockpit chamber with an illusion of movement around a racetrack;

at least one mechanism coupled to said cockpit chamber for providing physical movement to said chamber, wherein said at least one mechanism is capable of subjecting the driver in said cockpit chamber to a force of up to four G's for the duration of said simulation; and a controller for controlling said at least one display and said at least one mechanism to correspond to the driver's use of said controls.

15. The simulator system according to claim 14, wherein said controls include a steering wheel, a gear shifter, a brake pedal, a gas pedal and a clutch pedal.

16. A method of controlling a racecar simulator, comprising the steps of:

selecting a type of racecar to be simulated;

selecting values for suspension criteria, aerodynamic criteria, engine performance criteria and gearing criteria for the type of racecar selected;

determining the performance characteristics of the racecar selected depending upon the values entered for the adjustable features;

monitoring a driver's use of controls within the racecar simulator; and subjecting the driver to forces indicative of a real racecar having said performance characteristics and responding to said driver's use of the controls.

17. The method according to claim 16, further including the step of displaying a changing video image to the driver wherein said video image changes in a manner dependent upon said performance characteristics and said driver's use of the controls to provide the driver with an illusion of controlled forward motion.

18. The method according to claim 17, further including the step of selecting a racetrack and racing conditions to be simulated, wherein at least some of said racing conditions are used in determining said performance characteristics.

19. The method according to claim 18, wherein said step of selecting a racecar includes selecting a racecar type and selecting a racecar configuration available for the type selected.

* * * * *